Figure 1:
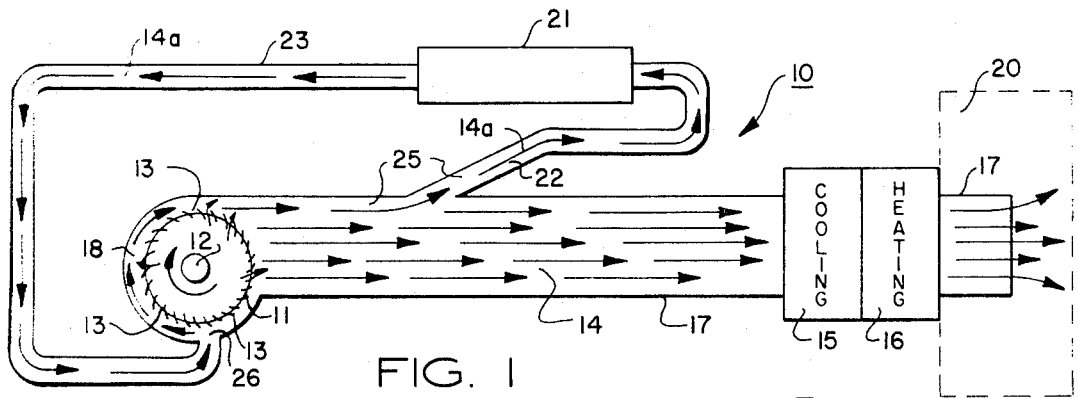

United States Patent [19]

Duke et al.

[11] 3,750,556
[45] Aug. 7, 1973

[54] AIR PURIFYING MEANS
[75] Inventors: Douglas Roy Duke; Asa M. Pearson, both of Dallas, Tex.
[73] Assignee: Air Guard Inc., Garland, Tex.
[22] Filed: Aug. 23, 1971
[21] Appl. No.: 173,824

[52] U.S. Cl.............. 98/2.11, 21/74 A, 204/319, 62/78
[51] Int. Cl. ........ B60h 3/00, F24f 3/12, A61l 9/00
[58] Field of Search .............. 98/2.11; 21/53, 54, 21/74, 102; 165/42; 204/318, 319, 176; 23/222; 99/228; 62/264, 78

[56] References Cited
UNITED STATES PATENTS
2,290,376  7/1942  Marshall ........................ 204/316
3,421,836  1/1969  Sundin et al..................... 21/53
3,494,723  2/1970  Gray .............................. 62/264

*Primary Examiner*—William F. O'Dea
*Assistant Examiner*—Paul Devinsky
*Attorney*—Richards, Harris & Hubbard

[57] ABSTRACT

Disclosed is apparatus for conditioning the air being supplied to a confined space, such as the compartment of a motor vehicle, the apparatus including an ozone generator being disposed as the feedback loop of the heating-cooling system of the motor vehicle. The ozone generator disclosed includes either a single sealed gas tube or a plurality of adjacently disposed sealed tubes.

6 Claims, 4 Drawing Figures

PATENTED AUG 7 1973 3,750,556

AIR PURIFYING MEANS

The present invention pertains to air conditioning systems, more particularly to the method of and apparatus for ozonizing air circulating in a confined space, and even more particularly to the combination of an ozone generator with the cooling and heating system of a motor vehicle.

It is generally recognized that the full and effective conditioning of air within an enclosed area involves more than just effective heating and cooling, but also requires the treatment of this air in such a manner as to eliminate any offensive qualities thereof. Thus, to accomplish these objectives, not only has air conditioning apparatus been designed to include means for controlling the proper humidity of the confined air, but also to reduce the irritants and offensive odors associated therewith. The efficient and effective conditioning of the air becomes even more critical with respect to enclosed spaces of automobiles and other motor vehicles since the presence of carbon monoxide therein presents a serious health hazard.

As a consequence, many air conditioning systems have included ozone generators for discharging ozone ($O_3$) into the confined space, which ozone then combines with the polluted air therein to reduce or eliminate noxious odors or irritants. In addition, it has been discovered that since ozone reacts with carbon monoxide to form oxygen and carbon dioxide, an innocuous gas at normal concentrations, the provision of ozone to the confined areas of the automobile also eliminates any carbon monoxide which is present therein. However, while various type systems have been designed to incorporate the ozone generating apparatus, these prior systems have generally proven unreliable and have not been completely effective for all conditions of service.

It is therefore a primary object of the invention to provide a new and improved air conditioning system incorporating ozone generating apparatus therewith.

It is a further object of the invention to provide a new and improved method and apparatus for effectively circulating ozone throughout a confined space of an automobile or other motor vehicle.

It is an even further object of the invention to provide a new and improved design of an ozonizer uniquely incorporated with the heating-cooling portion of an air conditioning system.

In accordance with these and other objects, the present invention is directed to apparatus for conditioning the air being circulated within a confined space, the apparatus including an ozone generator for purifying and decontaminating the air as it travels through the air-conditioning apparatus. Specifically, the ozone generator is incorporated with the heating-cooling system of an automobile in such a manner that air circulating within the system may be continuously recycled past the ozone generator, the generator being coupled intermediate the high and low pressure sides of the fan which directs the air past the cooling and/or heating units.

In accordance with a preferred embodiment, the ozone generator which is employed in the air conditioning apparatus comprises either a single sealed gas tube or a plurality of adjacently disposed sealed gas filled tubes, respective electrodes associated with each tube being coupled to a cyclically varying voltage source, one of the electrodes being disposed within the tube, the other electrode being disposed around or remote from the tube.

Figure 2:
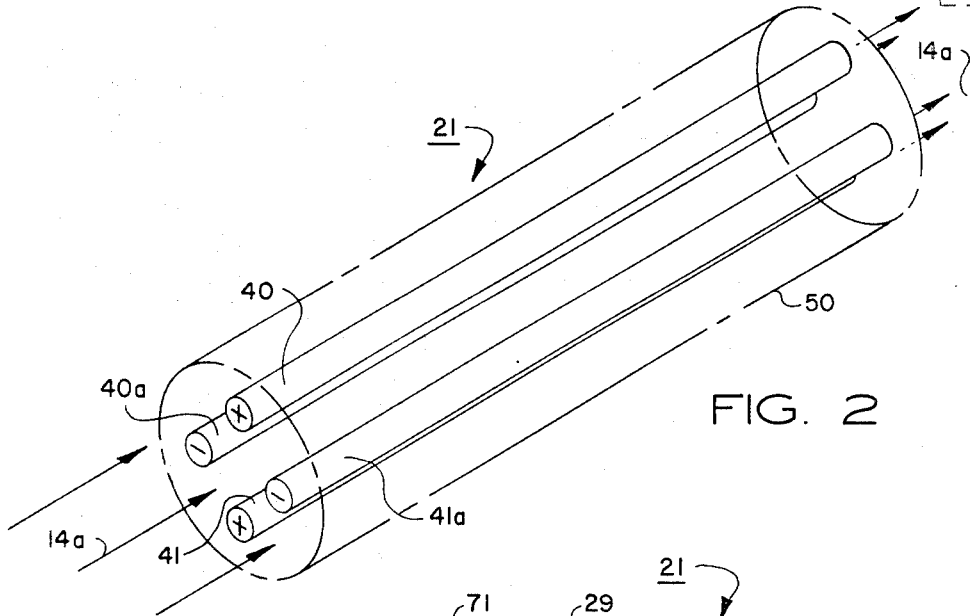
Figure 3:
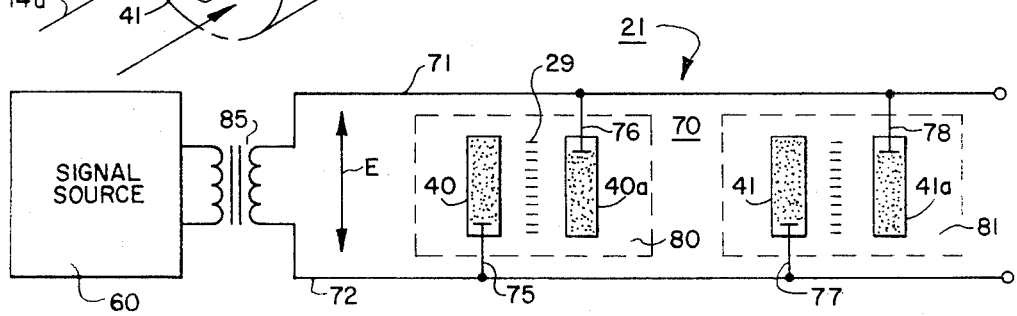
Figure 4:
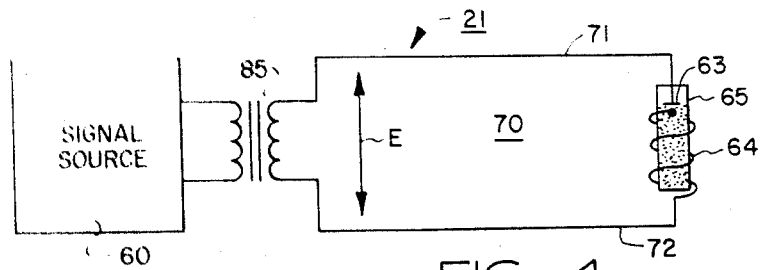

A more complete understanding of the invention, as well as additional features, advantages, and objects thereof, may be had by reference to the following detailed description taken in conjunction with the drawings, wherein:

FIG. 1 is a schematic representation of the apparatus of the invention illustrating the incorporation of the ozone generator with the heating-cooling system of an automobile;

FIG. 2 illustrated one preferred embodiment of the ozone generator;

FIG. 3 is a schematic illustration of the ozone generator shown in FIG. 2 illustrating the electrical connection thereto; and FIG. 4 illustrates an alternate embodiment of the ozone generator.

Referring now to FIG. 1, there is depicted apparatus 10 in accordance with the design of the present invention for conditioning the air supplied to the passenger compartment of an automobile. Accordingly, a conventional fan 11, which may be of the squirrel cage type, has an intake port 12 and a plurality of output ports 13 for circulating air flow 14 past the conventional cooling and heating portions 15 and 16 of the system. As illustrated, the fan may be adapted to rotate in a clockwise direction to direct the air flow in the direction of the arrows through the channel 18 and thereafter through the duct 17 past the cooling and/or heating apparatus. The so-conditioned air is then vented out the exit of the duct 17 into the interior compartment 20 of the automobile. The fan, ductwork, and heating-cooling portions are conventional and need not be further described for the purposes of the present invention.

In accordance with the unique feature of the present invention, however, an ozone generator 21 is coupled by way of conduits 22 and 23, as illustrated in FIG. 1, so that a portion 14a of the air flow is directed through the ozone generator 21 and thereafter into the channel 18 of the fan 11. The conduit 22 communicates with the duct 17 at the opening 25, and the conduit 23 communicates with the channel 18 at the opening 26, the opening 25 being located at a position of relatively higher pressure than that present at the opening 26. In this manner, the conduits 22 and 23 (and the generator 21) provide a negative feedback arrangement to enable the air portion 14a to flow in the direction represented by the arrows.

As a consequence of the arrangement illustrated in FIG. 1, the air which is to be supplied to the interior compartment 20 is thoroughly treated with ozone ($O_3$) prior to being cooled or heated by the units 15 or 16. Thus, the air which is subsequently introduced into the compartment 20 is effectively mixed with the ozone, which ozone is effective in reducing or substantially eliminating noxious odors contained within the enclosure 20, as well as eliminating any carbon monoxide which may exist therein.

While various designs of ozone generators may be utilized for the apparatus 21, in accordance with one preferred embodiment of the present invention, the ozone generator 21 may comprise apparatus illustrated in FIGS. 2 and 3. Accordingly, and with initial reference to FIG. 2, a plurality of elongated enclosures or tubes 40, 40a, 41, and 41a are disposed within a cylindrical housing 50, the air flow 14a being introduced into one end of the enclosure 50 past the elongated tubes and thereafter out the other end of this enclosure. As subsequently described, the oxygen within the airstream 14 is transformed into ozone at a highly efficient and controlled rate as it passes through the enclosure 50.

Disposed within, and sealed by, the walls of the tubes 40, 40a, 41, and 41a is a gaseous medium which ionizes in response to a minimum voltage differential appearing across the respective tube, the resulting ionization generating radiation of desired wavelength (normally 1,849A.). Referring now to FIG. 3, the generator 21 includes a signal source 60 for providing the required energy to the load network 70. The signal source 60 may be of any conventional type known in the art for supplying a cyclically varying voltage differential E across the leads 71 and 72, the output signals from source 60 being of the alternating or pulsating direct current type, for example. If required, a transformer 85 may be disposed between the source 60 and the load network 70 to provide the necessary step-up in voltage. It is pointed out, however, that the transformer 85 is not a critical portion of the apparatus 21 and may be omitted when the magnitude of the voltage supplied from the source 60 is of sufficient value.

As illustrated, the sealed tubes 40 and 40a are arranged in paired sets 80; and the sealed tubes 41 and 41a are arranged in paired sets 81, each tube of the particular set having an electrode respectively coupled to the leads 71 and 72 and which extend into the interior of the respective tube. For example, paired set 80 comprises sealed tubes 40 and 40a having respective electrodes 75 and 76 coupled to the output leads 72 and 71. Similarly, paired set 81 comprises sealed tubes 41 and 41a having respective electrodes 77 and 78 coupled to the leads 72 and 71.

As a consequence of the operation of the ozone apparatus 21, when the voltage potential between the electrodes 75 and 76, for example, reaches the minimum required value, at either the negative or positive portions of the cycle, both the tubes 40 and 40a trigger, the resulting burst of energy associated with the gas ionization within these tubes generating radiation of the 1,849A. wavelength through the walls of the tubes 40 and 40a and into the intervening space 29 between the tubes. The collision of this radiation with the oxygen atoms within the space 29, as well as the establishment of the high electrostatic field across the space 29 between the electrodes 75 and 76 consequently transforms the oxygen into ozone. Thus, and due to the combination of the radiation bombardment and the electrostatic field, increased efficiency and control of the ozone production is effected.

As thus described, it can be seen that an increased amount of ozone can be produced since the ozone generation is being caused not only by the radiation generation through the walls of the tube, but because adjacent tubes have their respective electrodes at differing potentials, and the resulting electrostatic field set up across the space between each adjacent tube also serves to assist in the ozone generation.

For convenience of illustration, each of the tubes have been designated in FIG. 2 by a positive (+) or negative (−) polarity indicating their relative voltage relationships with respect to one another. Thus, for example, at any one particular instance in time, the enclosure 40a is not only at a negative potential with respect to its associated paired tube member 40, as previously described, but is also at a negative potential with respect to the adjacent tube 41. As a consequence of this arrangement electrostatic field gradients are set up between the tubes of adjacent paired sets, which gradients also contribute to the generation of ozone within the atmosphere surrounding these tubes. Thus, it is observed that as the air flow 14a is introduced into one end of the enclosure 50, the oxygen within this airstream is transformed into ozone at a highly efficient and controlled rate as it passes throughout the other end of the enclosure 50 into the conduit 23.

As a consequence of the utilization of the paired sets of sealed tubes or enclosures in the manner previously described, a high degree of control can be maintained over the production of ozone by not only regulating the magnitude of the voltage applied to the leads 71 and 72, but also by changing the distance between adjacently disposed tubes of a particular set, or by regulating the distance between adjacent sets.

Referring now to FIG. 4, there is disclosed an alternate embodiment of the ozone generator 21. Accordingly, the load network 70 comprises, as distinguished from the embodiment just described with respect to FIG. 3, a single sealed tube 65 filled with the appropriate gaseous medium. As before, one of the electrodes 63 is disposed within, and sealed by, the wall of the tube 65. The other electrode 64 (coupled to output lead 72) is disposed on the outside of and coiled around the outer wall of the tube. Thus, the voltage potential E is established between the electrodes 63 and 64, thereby establishing the electrical field across the tube itself, and when the voltage potential E reaches the predetermined minimum, the gaseous medium within the tube 65 ionizes to discharge the radiation into the atmosphere surrounding the tube. Thus, it is observed as before, there is established both an electrostatic and radiation energy source directly adjacent the outside of the tube 65. By disposing this apparatus within a housing through which the air flow 14a is directed, as described with respect to FIG. 1, the combination of electrostatic and radiation energy effectively and efficiently converts this air to ozone for subsequent introduction into the compartment 20.

Various other modifications may be made to the disclosed embodiments of the invention, as well as alternate embodiments may be provided, without departing from the spririt and scope of the invention as defined by the appended claims.

What is claimed is:

1. Apparatus for conditioning the air being circulated through a confined space, said apparatus comprising:
   a blower having an input and an output for providing a source of air,
   a main duct in fluid communication with the output of said blower and said confined space,
   an ozone generator,
   a first feedback duct having an opening into said main duct and coupled to said ozone generator for delivery of a portion of the air from said blower to said generator, and
   a second feedback duct having an opening to said ozone generator and coupled to the input of said blower to deliver ozone treated air to said blower.

2. The apparatus as described in claim 1 wherein said first feedback duct has an opening at a relatively higher pressure than the second feedback duct at said blower.

3. The apparatus as described in claim 1 wherein said confined space is a compartment of a motor vehicle, and further including heating and cooling means disposed intermediate said first feedback duct and said compartment.

4. The apparatus as defined in claim 1 wherein said ozone generator comprises:
   i. a sealed enclosure having a gaseous medium disposed within said enclosure,
   ii. a pair of electrodes associated with said sealed enclosure, one of said electrodes being disposed within said enclosure, the other of said electrodes being disposed outside of but adjacent said enclosure, and
   iii. means for applying a cyclically varying voltage across said electrodes sufficient to ionize said gaseous medium, thereby to produce an electric field gradient between said electrodes as well as emitting radiation through the surrounding wall of said enclosure upon said ionization.

5. Apparatus for conditioning the air being circulated through a confined space, said apparatus comprising:

a source of air, duct means in fluid communication with said air source and said confined space, ozone generating apparatus including a sealed enclosure having a gaseous medium disposed within said enclosure, a pair of electrodes associated with said sealed enclosure, one of said electrodes being disposed within said enclosure, the other of said electrodes disposed within a second sealed enclosure having a gaseous medium therein, the pair of sealed enclosures being separated from one another by a defined space, and means for applying a cyclically varying voltage across said electrodes sufficient to ionize said gaseous medium, thereby to produce an electric field gradient between said electrodes as well as emitting radiation through the surrounding wall of said enclosures upon said ionization.

6. The apparatus as described in claim 5 wherein said cyclically varying voltage is effective to ionize the gaseous medium within said second sealed enclosure.

* * * * *